US012651434B2

(12) United States Patent
Amthor et al.

(10) Patent No.: US 12,651,434 B2
(45) Date of Patent: Jun. 9, 2026

(54) METHOD FOR THE ORDINAL CLASSIFICATION OF A MICROSCOPE IMAGE AND MICROSCOPY SYSTEM

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 767 days.

(21) Appl. No.: 17/954,412

(22) Filed: Sep. 28, 2022

(65) Prior Publication Data

US 2023/0105854 A1     Apr. 6, 2023

(30) Foreign Application Priority Data

Oct. 1, 2021     (DE) ...................... 10 2021 125 576.7

(51) Int. Cl.
| | |
|---|---|
| *G06V 10/764* | (2022.01) |
| *G06T 3/40* | (2024.01) |
| *G06T 7/62* | (2017.01) |

(52) U.S. Cl.
CPC .............. *G06V 10/764* (2022.01); *G06T 3/40* (2013.01); *G06T 7/62* (2017.01); *G06T 2207/10056* (2013.01); *G06T 2207/20081* (2013.01)

(58) Field of Classification Search
CPC ...... G06V 10/764; G06V 10/82; G06V 10/98; G06V 20/698; G06T 2207/10056;
(Continued)

(56) References Cited

U.S. PATENT DOCUMENTS

| | | |
|---|---|---|
| 2021/0225026 A1 | 7/2021 | Amthor et al. |
| 2022/0018652 A1 | 1/2022 | Amthor et al. |
(Continued)

FOREIGN PATENT DOCUMENTS

| | | |
|---|---|---|
| DE | 102020101191 A1 | 7/2021 |
| DE | 102020118801 A1 | 1/2022 |
| DE | 102020126737 A1 | 4/2022 |

OTHER PUBLICATIONS

Berg et al, "Deep Ordinal Regression with Label Diversity", 2020 25th International Conference on Pattern Recognition (ICPR), Jun. 2020, 8 pages (Year: 2020).*
(Continued)

*Primary Examiner* — Matthew C Bella
*Assistant Examiner* — Janice E. Vaz
(74) *Attorney, Agent, or Firm* — LaBatt, LLC

(57) ABSTRACT

A computer-implemented method for the ordinal classification of at least one microscope image calculates a classification into one of a plurality of classes which form an order with respect to an image property. The microscope image is input into a machine-learned model for ordinal classification. The model comprises binary classifiers which calculate estimates regarding whether the microscope image belongs to cumulative auxiliary classes, which combine different numbers of the classes which follow each other in the order. The estimates can be combined so as to form a total score, wherein the classification occurs by comparing the total score with threshold values which can be defined in a variable manner depending on the application, or interval limits of the classes can be defined so that the classes form intervals of different widths. The model for ordinal classification can also comprise further binary classifiers for inverse auxiliary classes.

20 Claims, 8 Drawing Sheets

(58) Field of Classification Search
CPC . G06T 2207/20081; G06T 2207/20084; G06T
2207/30024; G06T 2207/30168; G06T
7/0002
See application file for complete search history.

(56) References Cited

U.S. PATENT DOCUMENTS

| | | | |
|---|---|---|---|
| 2022/0113525 A1 | 4/2022 | Haase et al. | |
| 2022/0284616 A1 | 9/2022 | Amthor et al. | |
| 2022/0398719 A1* | 12/2022 | Song | G16H 70/60 |
| 2023/0047100 A1* | 2/2023 | Arcadu | G06V 20/695 |

OTHER PUBLICATIONS

Berg et al., "Deep Ordinal Regression with Label Diversity", 2020 25th International Conference on Pattern Recognition (ICPR), Jan. 10-15, 2021, 8 pages.

Liu et al., "Unimodal regularized neuron stick-breaking for ordinal classification", Neurocomputing 388 (2020), pp. 34-44.

Search Report for German Patent Application No. 10 2021 125 557.7, Jan. 20, 2023, 8 pages (English translation not available).

Frank, et al., 'A Simple Approach to Ordinal Classification', Conference Paper in Lecture Notes in Computer Science, Aug. 2001, DOI: 10.1007/3-540-44795-4_13, 12 pages.

"Ordinal Regression", Wikipedia, Sep. 13, 2021, website accessed Jul. 3, 2022, 5 pages.

* cited by examiner

| K | i | | H | j | | iH | j |
|---|---|---|---|---|---|---|---|
| K1 | [3.4 – 4.0) | | H1 | ≥ 3.4 | | iH18 | < 4.0 |
| K2 | [4.0 – 4.8) | | H2 | ≥ 4.0 | | iH19 | < 4.8 |
| K3 | [4.8 -5.7) | | H3 | ≥ 4.8 | | iH20 | < 5.7 |
| K4 | [5.7 – 6.7) | | H4 | ≥ 5.7 | | iH21 | < 6.7 |
| K5 | [6.7 – 8.0) | | H5 | ≥ 6.7 | | iH22 | < 8.0 |
| K6 | [8.0 – 9.5) | | H6 | ≥ 8.0 | | iH23 | < 9.5 |
| K7 | [9.5 – 11.3) | | H7 | ≥ 9.5 | | iH24 | < 11.3 |
| K8 | [11.3 – 13.5) | | H8 | ≥ 11.3 | | iH25 | < 13.5 |
| K9 | [13.5 – 16.0) | | H9 | ≥ 13.5 | | iH26 | < 16.0 |
| K10 | [16.0 – 19.0) | | H10 | ≥ 16.0 | | iH27 | < 19.0 |
| K11 | [19.0 – 22.6) | | H11 | ≥ 19.0 | | iH28 | < 22.6 |
| K12 | [22.6 – 26.9) | | H12 | ≥ 22.6 | | iH29 | < 26.9 |
| K13 | [26.9 – 32.0) | | H13 | ≥ 26.9 | | iH30 | < 32.0 |
| K14 | [32.0 – 38.1) | | H14 | ≥ 32.0 | | iH31 | < 38.1 |
| K15 | [38.1 – 45.3) | | H15 | ≥ 38.1 | | iH32 | < 45.3 |
| K16 | [45.3 – 53.8) | | H16 | ≥ 45.3 | | iH33 | < 53.8 |
| K17 | [53.8 – 64.0) | | H17 | ≥ 53.8 | | iH34 | < 64.0 |

FIG. 6

METHOD FOR THE ORDINAL CLASSIFICATION OF A MICROSCOPE IMAGE AND MICROSCOPY SYSTEM

REFERENCE TO RELATED APPLICATIONS

The current application claims the benefit of German Patent Application No. 10 2021 125 576.7, filed on 1 Oct. 2021, which is hereby incorporated by reference.

FIELD OF THE DISCLOSURE

The present disclosure relates to a microscopy system and a computer-implemented method for the ordinal classification of a microscope image.

BACKGROUND OF THE DISCLOSURE

The importance of the role played by an automatic or partially automatic exploitation of captured images in modern microscopy systems is continuously increasing. Exploitation frequently occurs by means of machine-learned models that have been trained using predetermined training data to perform a specific image exploitation or image processing. Classification models (classifiers), which perform a categorization of an input microscope image into one of a plurality of predetermined classes, are a very common type of machine-learned model. A binary classifier is designed to discriminate two cases, namely the case in which the microscope image belongs to a specific class and the case in which the microscope image does not belong to said specific class. The output of a binary classifier, which is called an estimate in the present disclosure, can be an indication of a probability that the microscope image belongs to the corresponding class.

If a larger number of potential classes are to be discriminated, a plurality of binary classifiers can be learned. For example, ten binary classifiers can be learned for ten different classes in order to make respective predications regarding whether the microscope image belongs to the corresponding classes. This approach is suitable, e.g., for a classification of a sample carrier type in order to discriminate the sample carrier types: microtiter plate with circular wells, chamber slides with rectangular sample chambers, slides with square cover slips and Petri dishes. A binary classifier can respectively be learned for each of these sample carrier types.

The present disclosure relates to an ordinal classification in which the classes form a logical order. In the aforementioned example of sample carrier types, there is no logical order between, e.g., microtiter plates, chamber slides and Petri dishes. A logical order does exist, on the other hand, e.g., in the case of a quality classification in which the following levels are to be discriminated: high image quality (good sample visibility), medium image quality (potentially adequate sample visibility) and poor image quality (inadequate sample visibility). An ordinal classification can also occur when the classification relates to numerical values, for example in the case of the classes "fewer than five biological cells present in the microscope image"; "five to ten cells present"; or "more than ten cells present". In principle, it is possible to utilize binary classifiers for the corresponding classes, e.g., a binary classifier for estimating whether there is a high image quality, a further binary classifier for a medium image quality and a third binary classifier for estimating a poor image quality. However, the order of the classes is lost with these classifiers. In the event of an incorrect classification of an image, there is an increased likelihood that said image is categorized as belonging to a class that is further away from the correct class, e.g., as possessing a poor image quality when it in fact exhibits a good image quality. In order to train a binary classifier to detect a medium image quality, it would be necessary to use training images in which both high-quality and low-quality images receive the same annotation, namely: "does not belong to the class 'medium image quality'". Simple classification models are thus disadvantageous for tasks which must take into account a class order.

In this context, ordinal classification presents advantages. In order to implement classification models for an ordinal classification so that the class order is taken into account, the utilization of special auxiliary classes is known. A corresponding procedure is described in:

Frank E., Hall M., 'A Simple Approach to Ordinal Classification', Conference Paper in Lecture Notes in Computer Science, August 2001, DOI: 10.1007/3-540-44795-4_13

The auxiliary classes comprise different numbers of the classes that follow each other in sequence according to the order. For example, the first auxiliary class can comprise all classes except for the first class, the second auxiliary class can comprise all classes except for the first two classes, a third auxiliary class can comprise all classes except for the first three classes, and so on. It is now possible for binary classifiers to be learned, wherein each binary classifier indicates as its result an estimate as to whether the input data (i.e. of the microscope image) belongs to the corresponding auxiliary class.

Whether or not data belongs to a specific class can be calculated from the estimates regarding whether said data belongs to the respective auxiliary classes. In the aforementioned article—cf., e.g., FIG. 1 of the article—the probability that data belongs to a class is calculated as a difference in the respective probabilities that said data belongs to two auxiliary classes. In the example in the cited article, the temperatures cold, mild and hot are discriminated. One auxiliary class comprises the temperatures "mild" and "hot" while another auxiliary class comprises the temperature "hot" only. The probability for the class "mild" is calculated by calculating the difference between the probability of the auxiliary class "mild/hot" and the probability of the auxiliary class "hot".

Compared to ordinary classifications, an ordinal classification using auxiliary classes that take into account a class order provides more precise and more robust results. In this context, it is desirable to further improve the reliability as well as possibilities for the application of ordinal classifications of microscope images.

SUMMARY OF THE DISCLOSURE

It can be considered an object of the invention to indicate a microscopy system and a method which enable a particularly precise ordinal classification of a microscope image for diverse applications.

This object is achieved by means of the microscopy system and methods of the independent claims.

The invention comprises a computer-implemented method for the ordinal classification of at least one microscope image in order to calculate a classification into one of a plurality of classes, wherein the classes form an order with respect to an image property. The at least one microscope image is input into a machine-learned model for ordinal classification. The ordinal classification model a comprises a plurality of binary classifiers, which respectively calculate an estimate regarding whether the microscope image belongs to a cumulative auxiliary class. Different numbers of the classes which follow each other in sequence in the order are combined in the cumulative auxiliary classes. The estimates of the binary classifiers are combined, in particular added together, so as to form a total score. The classification occurs by comparing the total score with variably definable threshold values. The threshold values can be variably defined, e.g., depending on the application.

The invention further comprises a computer-implemented method for the ordinal classification of at least one microscope image in order to calculate a classification into one of a plurality of classes, wherein the classes form an order with respect to an image property. The at least one microscope image is input into a machine-learned model for ordinal classification. The ordinal classification model comprises a plurality of binary classifiers, which respectively calculate an estimate regarding whether a microscope image belongs to a cumulative auxiliary class. Different numbers of the classes which follow each other in sequence in the order are combined in the cumulative auxiliary classes. The classification is calculated from the estimates of the binary classifiers. Interval limits of the classes are defined so that the classes form intervals of different widths.

When the classes describe intervals of different widths, it becomes possible to increase a precision around a specific value range. At the same time, a classification at least into rough classes is also possible over a particularly wide value range. This simultaneously permits the implementation of an ordinal classification for a wide spectrum of different microscope images as well as a high level of precision in a value range of interest.

A particularly high degree of flexibility is possible in terms of different applications or objectives when a total score is formed from the estimates of the binary classifiers, which is then compared with variably definable threshold values for the purposes of classification. By forming a total score, the predications of all classifiers can be taken into account in the classification in contrast to, e.g., the prior art cited in the introduction, where a difference between two classifier results is calculated instead of a total score. By comparing the total score with variably definable threshold values, a classification sensitivity can be modified without the need for a new training of the ordinal classification model. The assignment of a microscope image to a specific class can thus be readily varied without a re-training of the employed binary classifiers.

The invention also comprises a computer-implemented method for evaluating by means of an ordinal classification model at least one microscope image to be analyzed. The ordinal classification model is trained using microscope images for which a predetermined class annotation respectively indicates which class the associated microscope image belongs to. The classes form an order with respect to an image property from a first class to a last class. A plurality of auxiliary classes containing different numbers of sequential classes are formed as well as at least a plurality of inverse auxiliary classes which contain precisely the classes not contained in one of the auxiliary classes. Auxiliary class annotations which affirm or deny that the associated microscope image belongs to the different auxiliary classes and inverse auxiliary classes are generated from the class annotations for each microscope image. The ordinal classification model comprises a respective binary classifier for each of the auxiliary classes, said binary classifier being trained to calculate an estimate as to whether a microscope image belongs to the corresponding auxiliary class. The ordinal classification model also comprises a respective binary classifier for each of the inverse auxiliary classes that is trained to calculate an estimate as to whether a microscope image belongs to the corresponding inverse auxiliary class. The microscope image to be analyzed is input into the ordinal classification model. The thus calculated estimates of the binary classifiers of the auxiliary classes are combined so as to form a total score and/or the thus calculated estimates of the binary classifiers of the inverse auxiliary classes are combined so as to form a total score. A measure for the image property is determined based on the total score or based on both total scores.

The measure for the image property can in particular be a classification or a precise value in a continuous value range. Forming a total score allows the estimates of all binary classifiers pertaining to the auxiliary classes or inverse auxiliary classes to be utilized. In principle, this facilitates a better prediction than in the case of an ordinal classification in which a classification occurs solely by means of, e.g., the estimates of the two most relevant binary classifiers. When a total score is formed, a directionally biased deviation from the values of the training data specified as ground truth was partially observed in preliminary research conducted for the invention. However, when the ordinal classification model is trained with two paths (heads), wherein one path comprises the binary classifiers for the auxiliary classes and the other path comprises the binary classifiers for the inverse auxiliary classes, the two paths have a stabilizing effect on each other. This allows a training of a generally superior ordinal classification model. As a result, the utilization of the classifiers of both paths is not absolutely necessary in the inference phase so that in principle the measure for the image property can be determined from only one total score.

A microscopy system according to the invention comprises a microscope for image capture and a computing device which is configured to carry out one of the computer-implemented methods according to the invention.

The flexibility, quality and robustness of ordinal classifications can be advantageously improved with implementations according to the invention.

Optional Embodiments

Variants of the microscopy system according to the invention and methods according to the invention are the object of the dependent claims and are explained in the following description.

The aforementioned methods can be combined with one another. In particular, the cited method in which a total score is compared with variably definable threshold values can be supplemented by the features of the other cited method according to which interval limits of the classes are defined so that the classes form intervals of different widths. The aforementioned method utilizing inverse auxiliary classes can also be supplemented by the features of one or both of these methods; that is to say that, in addition to the inverse auxiliary classes, it is possible to add the features of the comparison of the total score with variably definable threshold values and/or the features of classes with intervals of different widths.

Variably Definable Threshold Values for Classification

The estimates of the binary classifiers can take the form of probability results concerning whether image data belongs to an auxiliary class. A probability result can lie, e.g., in a value range from 0 to 1. The value 1 indicates the highest level of confidence that image data belongs to an auxiliary class evaluated by the corresponding classifier. The probability results of all classifiers can be combined, in particular added together, so as to form a total score. The categorization into one of the classes occurs by means of the comparison of the total score with adjustable threshold values.

A user can be given the option, in particular via a computer screen, of variably adjusting one or more of the threshold values and thereby shifting the boundary between adjacent classes.

Optionally, an action recommendation is output to a user as a function of the classification. For example, the classifications can relate to different image qualities (e.g. good/moderate/poor sample visibility; or image noise low/medium/high). It can be provided that a workflow is continued automatically in cases of a high image quality. In cases of a low image quality, it can be provided that a workflow is automatically aborted or that an action recommendation to abort the workflow is issued. In cases of a medium image quality, a warning can be issued, whereupon a user has to manually select whether an initiated workflow is continued or cancelled.

A threshold value can be adjusted automatically as a function of an action of the user. For example, if a user elects to carry on with a workflow more often than not in cases of a medium image quality, then the threshold value by means of which the classes "high image quality" and "medium image quality" are separated can be modified. This threshold value can be lowered, i.e. shifted in the direction of the threshold value by means of which the classes "medium image quality" and "low image quality" are discriminated. As a result, the class "high image quality" will henceforth be determined more frequently in cases in which the user would have likely manually elected to carry on with a workflow, whereby a workflow is continued automatically and the effort on the part of the user is reduced. An automatic adjustment of the threshold values can also occur as a function of whether a user (repeatedly) ignores or disregards the action recommendation. A recommendation is deemed disregarded, e.g., when the class "low image quality" is established and a cancellation of the workflow is recommended, but the user elects to continue with the workflow nevertheless. In this case, the threshold value is shifted in the direction which causes the action recommendation disregarded by the user to occur less frequently. In the cited example, the threshold value is thus modified so that microscope images are more likely to be assigned a medium rather than a low image quality.

Order of Classes; Auxiliary Classes and Inverse Auxiliary Classes

The order of the classes can relate to an image property or a combination of image properties, in particular to an image content such as a number of depicted objects, a size of depicted objects, an orientation of depicted objects and/or a variance of depicted objects. The objects can be the sample or sample parts, e.g., biological cells or cell organelles, or a cover slip or other parts of a sample carrier. Instead of the plural form "objects", it is also possible for the disclosed descriptive statements to relate to one object only.

The image property can also relate to a property derived from the image content, e.g. a height position of a depicted image content, wherein the height position can be estimated in particular from a perspective distortion of the image content (a square cover slip is depicted in the microscope image, e.g., as a trapezoid depending on the angle of view, wherein the angle of the trapezoid depends on the angle of view and thus on the height position of the cover slip).

The image property can also relate to the image itself irrespective of depicted objects, e.g., to an image noise, an image brightness and/or an image sharpness.

The classes form an order with respect to the image property so that a value corresponding to the image property increases, for example, from a first class to a last class; for example, the number or size of depicted objects increases from the first class to the last class or the level of image noise increases continuously from the first class to the last class. The reverse order is also possible.

The auxiliary classes are formed so that one or more of the classes are combined in each auxiliary class. Auxiliary classes can be formed so as to respectively comprise one less class from one auxiliary class to the next. For example, the first auxiliary class can comprise all classes; the second auxiliary class can comprise all classes except the first class; the third auxiliary class can comprise all classes except the first and second classes, and so on. Optionally, said first auxiliary class can be omitted. A training image with the annotation "belongs to the second class" is categorized as belonging to the first and second auxiliary classes and as not belonging to further auxiliary classes.

Conversely, auxiliary classes can also be formed so as to respectively comprise one more class from one auxiliary class to the next. These auxiliary classes can also be called inverse auxiliary classes. For example, a first (inverse) auxiliary class can correspond to a first class of the order, a second (inverse) auxiliary class corresponds to the first and second classes of the order, a third (inverse) auxiliary class corresponds to the first to third classes of the order, and so on. Corresponding auxiliary class annotations can be generated from class annotations in these configurations as well. The auxiliary class annotations and associated microscope images are utilized to train corresponding binary classifiers.

It is optionally possible to form an auxiliary class that comprises all classes and/or an auxiliary class that does not comprise any classes. It is likewise additionally possible to form an inverse auxiliary class that comprises all classes and/or an inverse auxiliary class that does not comprise any classes.

In other words, it is possible to form a plurality of auxiliary classes in which different numbers of classes that follow each other in sequence are combined as follows: A first auxiliary class comprises all classes. Each further auxiliary class respectively comprises one less class, according to the order and starting with the first class. That is to say that a second auxiliary class comprises the same classes as the first auxiliary class except for the first class; a third auxiliary class comprises the same classes as the second auxiliary class except for the second class, and so on. A last auxiliary class comprises the last class alone. Analogously, it is possible to form a plurality of inverse auxiliary classes in which different numbers of classes that follow each other in sequence are combined as follows: A first inverse auxiliary class comprises the first class alone while every further inverse auxiliary class respectively comprises one further class according to the order. That is to say that the second inverse auxiliary class comprises the class(es) of the first inverse auxiliary class and additionally the second class; the third inverse auxiliary class comprises the classes of the second inverse auxiliary class and additionally the third class, etc. A last inverse auxiliary class comprises all classes. The last inverse auxiliary class can be omitted where appropriate.

Ordinal Classification Model

The model for ordinal classification (ordinal classification model) can comprise at least one neural network and can be learned using training data. It comprises a plurality of binary classifiers which respectively output an estimate regarding whether an input microscope image belongs to one of the auxiliary classes or inverse auxiliary classes described in the foregoing. The classification carried out by the ordinal classification model can also be called ordinal regression. In particular, the ordinal classification model can comprise one or more convolutional neural nets or networks (CNNs). Model parameter values of the ordinal classification model, for example entries of convolution matrices of a CNN, are determined using the training data, in particular by means of microscope images with associated, predetermined (auxiliary) class annotations. Parameter definition can occur iteratively by means of a learning algorithm, for example by means of a gradient descent method and backpropagation.

A plurality of microscope images can be used as input data in the training of the ordinal classification model, wherein a desired result (ground truth) can be specified per microscope image in the form of an annotation for each of the binary classifiers. The annotation can respectively indicate whether or not the microscope image belongs to the auxiliary class queried by the corresponding binary classifier. It is thus possible to utilize a plurality of annotations, corresponding to the number of (single) binary classifiers, for each microscope image. These annotations can be determined automatically from a single annotation indicating the specific class to which the microscope image belongs.

A (single) binary classifier can be a program, for example a neural network or a part of the same, which discriminates the presence and the absence of a property, in the present context whether there exists the case "belongs to the auxiliary class" or the opposite case "does not belong to the auxiliary class". In principle, the output of a binary classifier can be one of two possible values in order to discriminate the aforementioned cases, e.g., by the values 0 and 1. Alternatively, the output is an estimate or probability for the presence of the property, in this case the property "belongs to the auxiliary class". The output can take any value in the interval 0 to 1, wherein a larger value indicates a higher probability that the image data (e.g., a microscope image) belongs to the corresponding auxiliary class. A binary classifier is provided for each auxiliary class, wherein there can in particular be three or more auxiliary classes and corresponding binary classifiers.

In the total score, the estimates of all binary classifiers (for the auxiliary classes or for the inverse auxiliary classes) are combined, for example as a sum, although other mathematical operations are in principle also possible.

A classification can occur by means of the total score by first rounding the total score to a whole number. There can now occur a classification into the class that corresponds numerically to the whole number in the above numeration of classes and auxiliary classes. If the total score is 5.8, for example, then this value is rounded to the whole number 6 and a classification into the sixth class is carried out accordingly.

In other words, it is possible to identify the auxiliary class that corresponds numerically to the whole number to which the total score was rounded. The classification occurs into the class that covers an interval running from a limit value of the identified auxiliary class to a limit value of the subsequent auxiliary class. In the cited numerical example, the total score of 5.8 is rounded to 6, whereby the class covering the interval between the limit value of the sixth auxiliary class and the limit value of the seventh auxiliary class is selected.

The ordinal classification model does not necessarily have to be utilized for a classification; instead, a calculated total score can also be converted to a continuous variable of the image property, i.e. to any value in a continuous value range of the image property. A conversion of the total score to a value in a continuous value range can occur via a function by means of which a class number or number of an auxiliary class is mapped to a limit value of the class/auxiliary class, as described in greater detail in the following. Limit values of the image property which differentiate neighboring classes or auxiliary classes from one another are specified for the classes and thus also for the auxiliary classes. If, for example, the limit values 4.0 pixels and 4.8 pixels are specified for the image property "object size", then one of the classes covers the interval from 4.0 to 4.8 pixels. These limit values indicate minimum values for auxiliary classes, i.e. one auxiliary class covers the range "object size ≥4.0 pixels" and one auxiliary class covers the range "object size ≥4.8 pixels". Inverse auxiliary classes can use these limit values as upper limits, i.e. one inverse auxiliary class covers the range "object size <4.0 pixels" and one auxiliary class covers the range "object size <4.8 pixels". It is possible to specify or (iteratively) determine a function that maps the number of the auxiliary class to the corresponding limit values. The limit values can also have been originally defined precisely by this function, i.e. the values 1, 2, 3, etc. are entered into the function in order to define the corresponding limit values. The total score can now be increased by 0.5 and entered into this function in order to calculate (instead of a limit value) the sought value of the image property. The increase by 0.5 results from the fact that the relevant binary classifier should provide a low confidence level at a limit value and thus a value of approximately 0.5, whereas a whole number was entered into the function in the definition of the limit value.

The further total score, which is calculated from the estimates of the binary classifiers for the inverse auxiliary classes, should ideally be equal to the total score of the binary classifiers for the auxiliary classes. A discrepancy between the two total scores is indicative of inaccuracies in the estimate. In this case, the two total scores can be averaged. It is optionally possible in this case for a feedback or warning to be generated regarding the low level of confidence.

It is also possible for the ordinal classification to occur for each pixel of an input microscope image. This permits the generation of a semantic segmentation, wherein at least some of the classes that are discriminated in the semantic segmentation are governed by a sequence and thus form an order. A semantic segmentation is understood to mean that each pixel of the microscope image is assigned to one of a plurality of possible classes. The classes can designate, e.g., different structures. In cases where the microscope image to be segmented is an overview image, an order can be formed, for example, by a distance to the actual sample. Different classes in an order of increasing distance from the sample can be, e.g.: "sample", "cover slip area outside of sample", "cover slip edges", "transparent sample carrier area", "labelling field on sample carrier", "retaining clips holding the sample carrier". An ordinal classification reduces the probability of drastically incorrect classifications, for example that image pixels are categorized as belonging to the class "sample" although said image pixels are directly adjacent to and surrounded by pixels that have been categorized as "retaining clips holding the sample carrier".

Classes with Intervals of Different Widths

Interval limits of the classes can be defined so that the classes form intervals of different widths, i.e. value ranges of different widths. The limits and width of an interval can be indicated numerically so that the image property on which an order of the classes is based is expressed or represented numerically. For example, the image property "confluence" can be indicated as a number, i.e. a proportion of the microscope image overgrown or covered by cells, expressed as a percentage or a number of pixels. Intervals of different widths mean that the respective difference between the lower limit and the upper limit of the corresponding interval is different for different intervals. Intervals of lesser widths represent a higher resolution with respect to the image property. The ordinal classification is thereby able to provide a higher resolution in a specific value range with respect to the image property than in other value ranges. By means of wider intervals, it is possible for the classes to cover a larger overall value range so that intervals of different widths combine the advantage of a high resolution in a value range of interest with the advantage of a predication over a particularly large value range.

As the auxiliary classes are formed by the classes and intervals of the classes have different widths, limits between the auxiliary classes also lie at different distances from one another. The wider an interval of a specific class, the further apart are the limits of the two corresponding auxiliary classes to which said class belongs in the one case and does not belong in the other.

A width of an interval of one of the classes can be defined so as to be, for example, greater, the greater an interval lower limit of this class. In other words, intervals become wider as the numerical value of the image property increases. In particular, the interval width can be an exponential function of the numerical value of the image property. The image property can be, e.g., a length or size of depicted cells or other objects in pixels. For example, the width of the intervals (or the interval limits between the classes) can be proportional to $2^{(s+c)}$, wherein in the exponent s indicates the cell size in pixels and c is a constant. For the limits of the auxiliary classes, the following limits in pixels px or arbitrary units can result:

"≥1px", "≥2px", "≥4px", "≥8px", "≥16px", "≥32px"

A width of the intervals can be defined so as to be greater, the greater the distance of the corresponding class from a predetermined target value. The distance can be measured based on the interval limit that is closer to the target value. The classes can relate to, e.g., a geometric property of the image content of the microscope image and the predetermined target value can be a desired value/target value of the geometric property. In particular, the image property on which the class order is based can be an object size and the target value can be, for example, 10 pixels. Narrow classes can be defined around a value of 10, for example 6-9 pixels, 9-11 pixels and 11-14 pixels, while wider classes, for example 50-60 pixels and 60-80 pixels, are defined for more distant values.

It is possible to provide an image processing algorithm which converts the microscope image as a function of the classification or as a function of the total score so that geometric property is rendered closer to the predetermined target value. For example, if the geometric property is an image size of depicted objects, the image processing algorithm can perform a scaling of the microscope image so that an object size in pixels is rendered closer to the desired target value of, for example, 10 pixels. This facilitates a subsequent image analysis. It is possible to use, e.g., a further machine-learned model, for example for counting cells, for said image analysis and a training for this model is greatly simplified when merely images of objects with a uniform size of approximately 10 pixels are expected as inputs. More generally, the predetermined target value can be a desired result of an image processing algorithm that is calculated by the image processing algorithm from the microscope image, wherein the result relates to a geometric property of the image content of the microscope image.

The mathematical operation of the image processing algorithm can depend on the classification of the ordinal classification. If, for example, the class 50-60 pixels is calculated for an object size and the target value is 10 pixels, then the image processing algorithm can carry out a scaling by means of which the determined object size is scaled to the target value, in this specific numerical example, e.g., by scaling by the factor 10/55, i.e. by the factor "target value divided by mean of the calculated class". If, instead of a classification, a value of the image property is calculated in a continuous value range (e.g. an object size of 53 pixels), then the conversion of the microscope image can occur using the continuous value, e.g., by scaling by the factor 10/53.

A new classification can occur in the described manner for a microscope image converted by the image processing algorithm. This can serve a quality control in order to ensure that the target value has been reached by the image processing algorithm, for example that the object size is in fact 10 pixels. Optionally, the image processing algorithm can convert the converted microscope image as a function of the new classification in order to further improve the approximation of the desired value by the geometric property, i.e., to reduce a difference between the geometric property and the desired value. For example, if it is established that the object size is in fact 11-13 pixels after scaling, a new scaling can occur in order to improve the approximation of a desired value of 10 pixels. Classes of different widths are suitable for this iterative approach in order to ultimately permit a very precise approximation of the target value for a particularly large value range.

The microscope image can serve as one of a plurality of training images by means of which a model, i.e. the ordinal classification model or some other model, is machine-learned. The model can be designed, for example, as a CNN. Such cases can in particular lend themselves to a data augmentation in which one or more new images are calculated from the microscope image, wherein the calculated new images are also used as training images. The microscope image and the new images can differ from one another with respect to the cited image property, for example the scaling or rotation of the microscope image can be varied in order to generate the new images. In the data augmentation, it is possible to take into account an optionally predetermined value of an image property of a microscope image used in the training, or alternatively the classification or the total score, so that the new images belong to the same class as the microscope image. In further variants of this process, new images belonging to other classes are generated in a controlled manner. For a training it is important that the training data covers different classes in a representative manner and that images of one class are not inadvertently overrepresented relative to images of another class. This is ensured by the (auxiliary) class-conserving data augmentation.

General Features

A microscopy system denotes an apparatus which comprises at least one computing device and a microscope. A microscope can in particular be understood as a light microscope, an X-ray microscope, an electron microscope or a macroscope.

The computing device can be designed to be decentralized, be physically part of the microscope or can be arranged separately in the vicinity of the microscope or at a location at an arbitrary distance from the microscope. It can generally be formed by any combination of electronics and software and comprise in particular a computer, a server, a cloud-based computing system or one or more microprocessors or graphics processors. The computing device can also be configured to control microscope components.

Method variants can optionally comprise the capture of at least one microscope image by the microscope while in other method variants an existing microscope image is loaded from a memory.

Descriptions in the singular are intended to cover the variants "exactly 1" as well as "at least one". Descriptions of an input of a microscope image into the ordinal classification model are intended to comprise, for example, the possibilities that exactly one or at least one microscope image is used. A common processing of a plurality of microscope images can be appropriate, e.g., when the microscope images constitute an image stack (z-stack) which shows sample layers at different heights.

A microscope image can be understood as an image captured by a microscope or calculated by means of measurement data of a microscope. In particular, the microscope image can be formed by one or more raw images or already processed images of the microscope. The microscope image can also be calculated from measurement data of an overview camera on the microscope. If the microscope is a light microscope, the microscope image can also be a sample image captured by a sample camera which is provided in addition to the overview camera and which captures an image with a higher magnification than the overview camera. Microscope images can also be generated by other types of microscopes, for example by electron microscopes or atomic force microscopes. More generally, a microscope image can also be understood as data derived from at least one microscope image, for example a feature vector calculated by a neural network from the at least one microscope image. In principle, simulated or artificially generated images that were not captured by a microscope can also serve as microscope images.

The characteristics of the invention that have been described as additional apparatus features also yield, when implemented as intended, variants of the method according to the invention. Conversely, a microscopy system and in particular the computing device can also be configured to carry out the described method variants. While a ready-trained model is used in some variants, further variants of the invention result from the implementation of the corresponding training steps, and vice versa.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIG. 6 shows classes as well as auxiliary classes and inverse auxiliary classes formed from said classes as used for an illustrative ordinal classification;

DETAILED DESCRIPTION OF EMBODIMENTS

Different example embodiments are described in the following with reference to the figures.

FIG. 1

Figure 1:
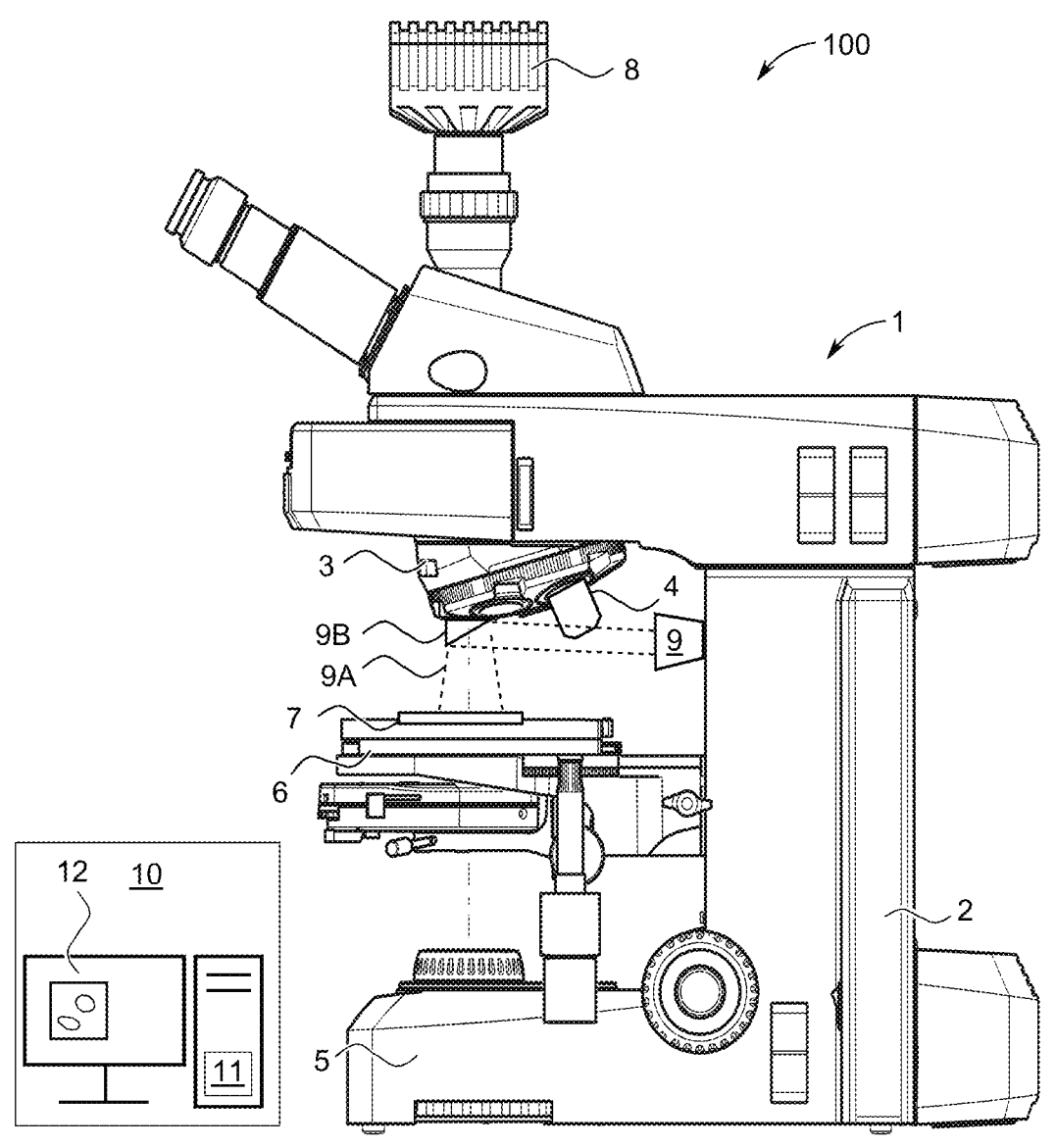
FIG. 1 is a schematic illustration of an example embodiment of a microscopy system according to the invention.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 8. When the objective 4 is pivoted into the light path of the microscope, the microscope camera 8 receives detection light from a sample area in which a sample can be located in order to capture a microscope image. In principle, a sample can be or comprise any object, fluid or structure. The microscope 1 optionally comprises an additional overview camera 9 for capturing an overview image of a sample environment. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror is omitted or a different arrangement of the mirror or some other deflecting element is provided. The computing device 10 comprises an optional touchscreen 12 and a computer program 11 for processing at least one microscope image, i.e. a sample image or overview image. This is discussed in greater detail in the following with reference to the following figures.

FIG. 2

Figure 2:
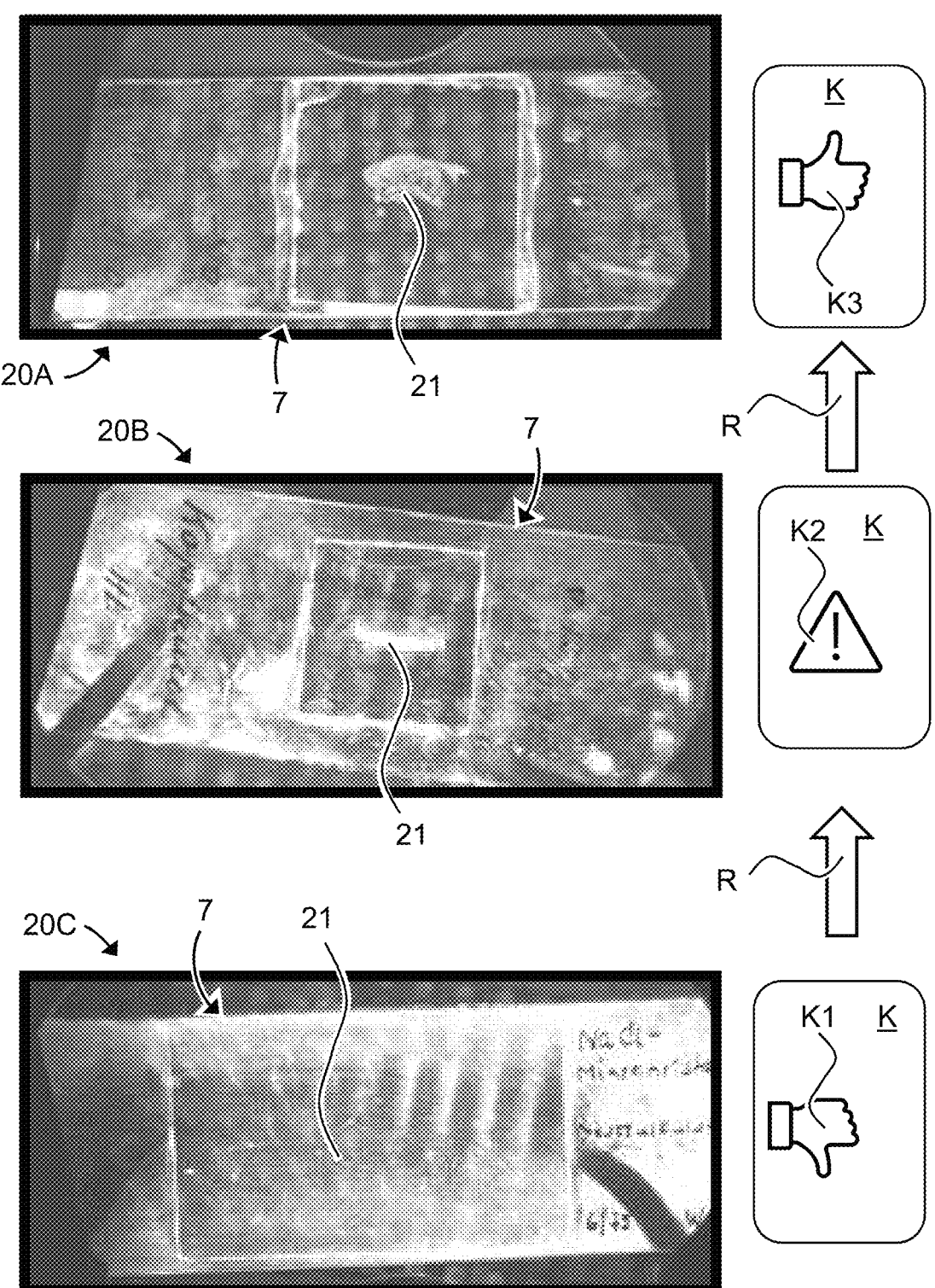
FIG. 2 schematically shows a plurality of microscope images with an associated ordinal classification.

FIG. 2 schematically shows a plurality of microscope images 20A-20C, which in this example are overview images with different image qualities. Different image qualities are indicated by different classes K. In the microscope image 20A, the visibility of a sample carrier 7 with a sample 21 is good, which corresponds to a high image quality (class K3). The microscope image 20B likewise shows a sample carrier 7 with a sample 21, but here the visibility of the sample 21 is indefinite. This corresponds to a medium picture quality (class K2). In the microscope image 20C, merely a sample carrier 7 is discernible while a sample 21 is barely visible or not visible at all, which corresponds to a poor image quality (class K1).

An ordinal classification model is intended to be able to perform a classification of the microscope images 20A-20C into the classes K1-K3. The illustrated microscope images 20A-20C can be training images for the ordinal classification model, in which case the classes K1-K3 are predetermined class annotations that have been, for example, assigned manually. Once the ordinal classification model is ready-trained, it is able to determine the respectively applicable class K1, K2 or K3 from an entered microscope image 20A-20C.

In principle, a classification model for the three classes K1-K3 could comprise three binary classifiers which calculate a probability regarding whether an input microscope image belongs to the first, second and third class K1-K3, respectively. However, this alone would not take into account the logical order R of the classes K1-K3, in which the class K2, medium image quality, lies between the classes K1 and K3 for a low and a high image quality, respectively.

The order R of the classes K is taken into account by means of auxiliary classes, as described in greater detail with reference to the following figure.

FIG. 3

Figure 3:
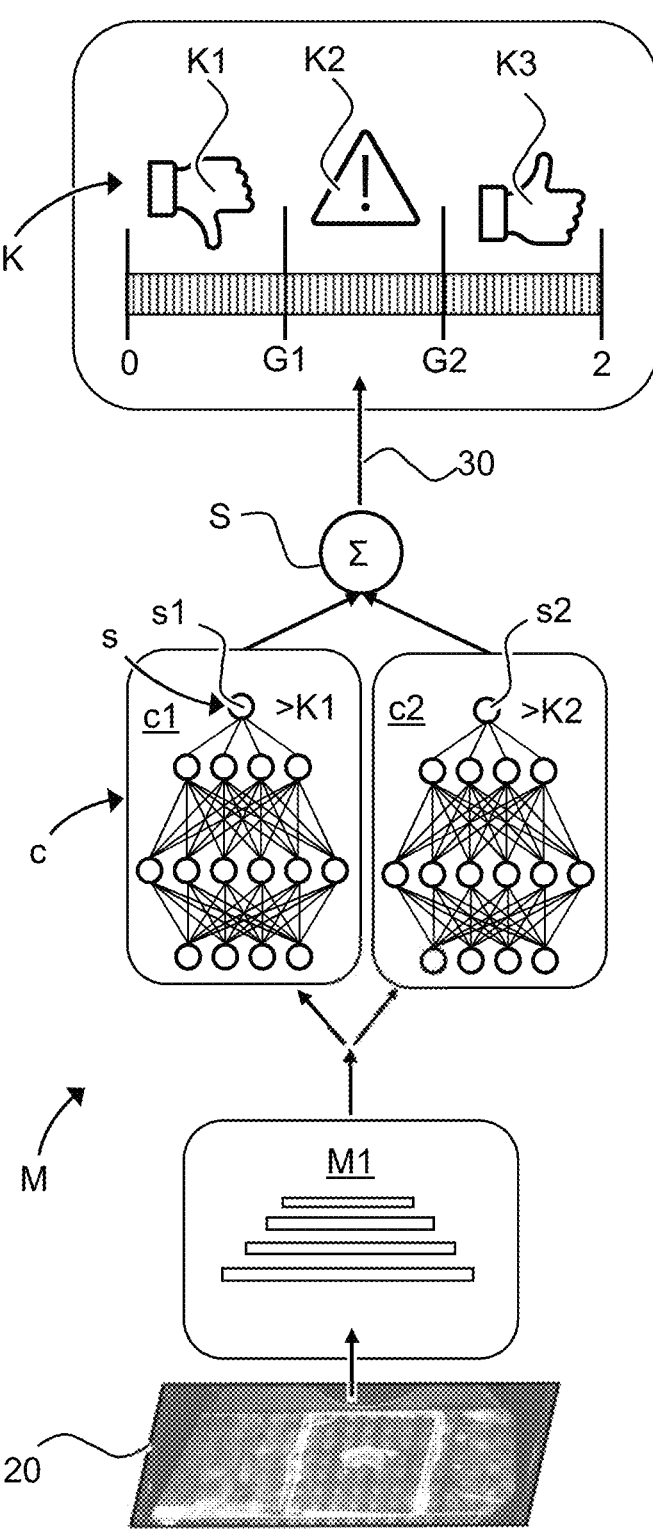
FIG. 3 schematically shows processes of an example embodiment of a method for ordinal classification according to the invention.

FIG. 3 schematically shows an example embodiment of a computer-implemented method according to the invention. The method can be implemented by means of the computer program of FIG. 1 and/or the computing device of FIG. 1 can be configured to carry out the method.

FIG. 3 schematically shows an ordinal classification model M, which comprises a backbone M1, i.e. a first processing section, and subsequent binary classifiers c. Two binary classifiers c1, c2 are provided in this example, although it is possible to add further binary classifiers as a function of the number of classes. A microscope image 20 to be classified is input into the ordinal classification model M, i.e. its backbone M1. From the microscope image 20 the backbone M1 calculates a feature vector, which is input into the binary classifiers c1, c2.

Each binary classifier c1, c2 calculates the probability that the microscope image 20 should be assigned to an auxiliary class belonging to the binary classifier c1, c2. The auxiliary class of the classifier c1 comprises all classes >K1 (thus the classes K2 and K3 in this example). The auxiliary class of the classifier c2 comprises all classes >K2 (i.e. the class K3 in this example). If there are further classes, further auxiliary classes can be formed accordingly for which respective binary classifiers are added. The classifiers c are independent of one another, i.e. no classifier receives the output of another classifier as input.

The classifier c1 outputs as its result an estimate s1 which indicates a probability that the microscope image 20 belongs to the auxiliary class >K1 or, in other words, exceeds a limit value between the class K1 and the class K2 (surpasses the limit value in the direction of the class K2). The estimate s1 has a value range from 0 to 1.

Analogously, the classifier c2 calculates an estimate s2, which lies in the value range from 0 to 1 and indicates a probability that the microscope image 20 belongs to the auxiliary class >K2. More generally, each classifier c outputs an estimate s relating to an associated auxiliary class.

Next, a total score S is formed as the sum of all estimates s1, s2. In this example, the possible value range of the total score S runs from 0 to 2; more generally, the value range runs from 0 to the number of binary classifiers. It is mentioned here merely for the sake of completeness that it is also possible to add a binary classifier whose auxiliary class comprises the classes ≥K1.

The total score S is compared with limit or threshold values G1, G2 in order to carry out a classification 30 into one of the classes K1-K3. The number of threshold values G1, G2 can be one less than the number of classes K1-K3.

The first threshold value G1 can have a value between 0 and 1 (e.g. 0.5) and the second threshold value G2 can have a value between 1 and 2 (e.g. 1.5). It is possible to define further threshold values according to this pattern should there be further classes and thus further threshold values.

If the total score S lies below the first threshold value G1, a classification of the microscope image 20 into the class K1 is performed. If the total score S lies between the threshold values G1 and G2, a classification into the class K2 occurs. If the threshold value G3 is exceeded, the class K3 is adopted.

Specific values of the threshold values G1, G2 can be defined in a variable manner. This allows the limits between the classes K1-K3 to be varied without the need for a new training of the binary classifiers s1, s2, i.e. of the ordinal classification model M.

In order to modify class limits in a traditional classification model, a new training would take place: For example, some class annotations of microscope images used in the training would be changed; e.g., the annotation of a microscope image in which the visibility of a sample is good but not very good would be changed from K3 to K2. A new training would be carried out with the modified annotations. However, in particular in cases of a CNN architecture and a large quantity of training images, for example tens of thousands of images, the required effort would be considerable. The variable definition of the threshold values G1, G2, on the other hand, provides significant time savings and an improved flexibility.

A user can be provided with selection means, for example an adjustable slider displayed on the computer screen by means of which the user can manually alter the threshold values G1, G2 and thus the sensitivity for the different classes K1-K3.

An automatic adjustment of the threshold values G1, G2 can also occur as a function of a user behaviour upon completion of the training of the ordinal classification model M: For example, if a microscope image is classified into the class K2, a warning can be output to a user stating that it is uncertain whether the microscope image or the current setup is suitable for a further workflow or for a continuation of a workflow, e.g., for a further processing of the microscope image or a navigation to a sample point with subsequent image capture. If the user repeatedly cancels the workflow in cases of classifications into the class K2, the threshold value G1 can be increased, for example from 1.5 to 1.7. A classification into the class K1 rather than into the class K2 accordingly becomes more likely. The ordinal classification model M will consequently classify a microscope image in this range as unsuitable (class K1), thus reflecting user behaviour.

If a user deems microscope images of the class K2 to be predominantly suitable and continues with the workflow, then the threshold value G2 can be automatically reduced, e.g., from 1.5 to 1.3. Microscope images are thus more likely to be classified as suitable (class K3) and less likely to be classified as uncertain (class K2).

Alternatively or additionally, if a user repeatedly carries on with a workflow in spite of classifications of microscope images into the class K1 (poor quality), the threshold value G1 can be reduced so that the class K2 (average quality) is determined more frequently with the ordinal classification model M instead of the class K1.

A variant of the embodiment of FIG. 3 is described with reference to the following figure.

FIG. 4

Figure 4:
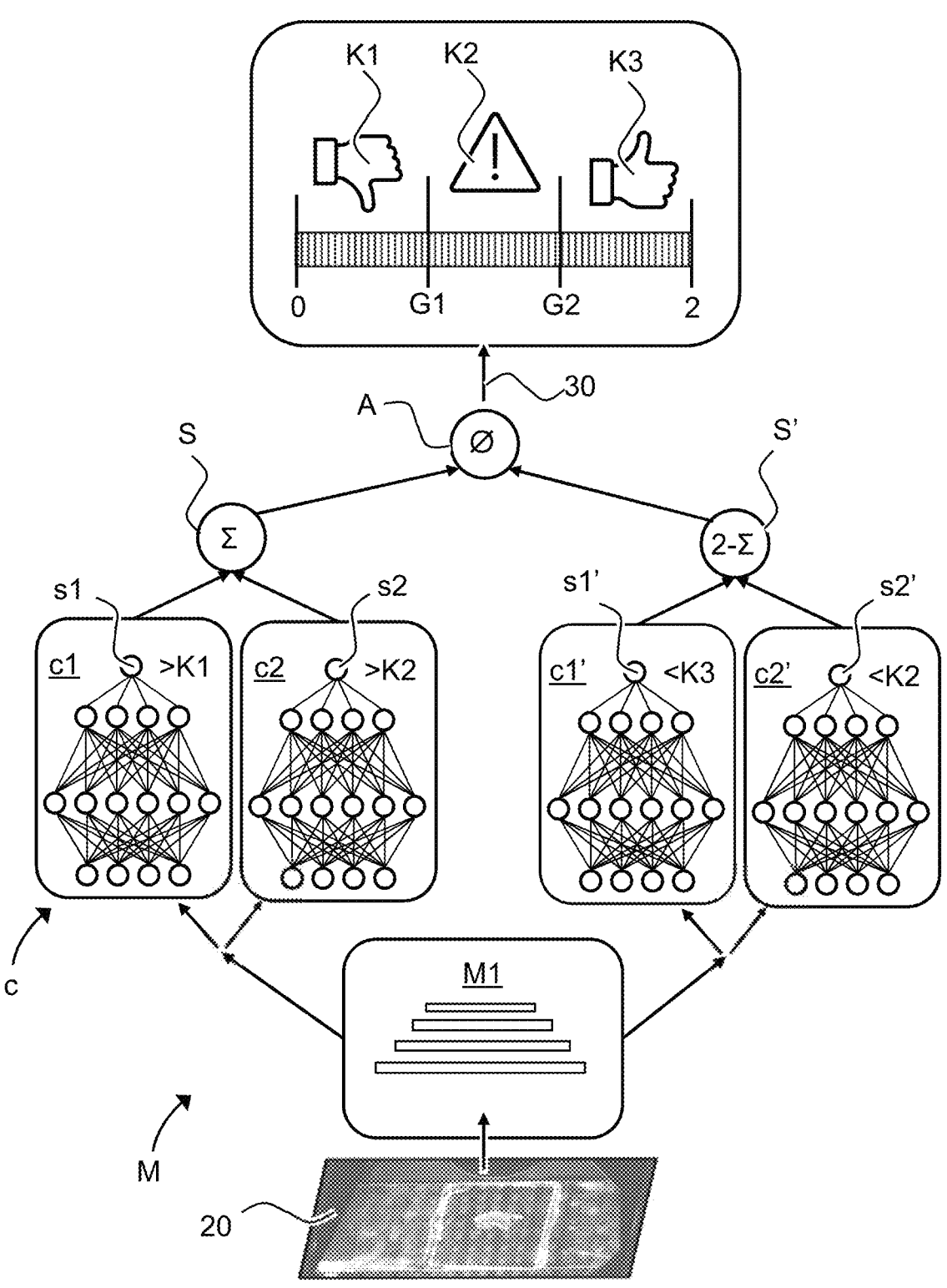
FIG. 4 schematically shows processes of a further example embodiment of a method for ordinal classification according to the invention.

FIG. 4 schematically shows a further example embodiment of a computer-implemented method according to the invention.

As described with reference to FIG. 3, an ordinal classification model M is used which comprises a backbone M1 and a plurality of binary classifiers c1-c2 whose estimates s1-s2 are added together to form a total score S.

In contrast to FIG. 3, the feature vector output by the backbone M1 is also fed to further binary classifiers c1'-c2'. The further binary classifiers c1'-c2' also calculate an estimate regarding whether the microscope image 20 belongs to a respective auxiliary class, which is called inverse auxiliary class in the following. The (inverse) auxiliary classes of the further binary classifiers c1'-c2' start by separating the classes K1-K3 into two groups from a different end than the binary classifiers c1-c2. That is to say that the classifier c1' indicates an estimate s1' that the microscope image 20 belongs to an inverse auxiliary class comprising the classes <K3 (i.e. the classes K1 and K2). The next classifier c2' indicates an estimate s2' that the microscope image 20 belongs to an inverse auxiliary class comprising the classes <K2 (i.e. the class K1). In the event of further classes, further binary classifiers would be formed accordingly for which the segregation between classes is respectively reduced by one class.

A further total score S' is formed in the illustrative auxiliary classification described here by forming the sum of the estimates s1', s2' of all further binary classifiers c1', c2' and subtracting this sum from the total number of further binary classifiers (2 in this example). The further total score S' should ideally equal the total score S of the binary classifiers c1-c2. In the event of a discrepancy, this can be utilized as a measure of accuracy.

An average A of the total score S and the further total score S' is generally more accurate than a total score S of an ordinal classification model which does not comprise the further binary classifiers c1'-c2'. The average A can be calculated, e.g., as A=(S+S')/2. The average A is used for the classification 30 of the microscope image 20 into one of the classes K1-K3 in the same manner as described for the total score S with reference to FIG. 3. The threshold values G1, G2 can again be variably definable or, alternatively, can be predetermined constants.

In a variant of this embodiment, a classification 30 of the microscope image 20 into one of the classes K1-K3 is carried out with the total score S and the further total score S', respectively. If the same class is determined in both cases, it is possible to assume a high level of reliability while a warning can be output in cases of differing determined classes.

In a training of the ordinal classification model M shown in FIG. 4, the backbone M1 is trained both over the path (head) of the classifiers c1, c2 as well as over the path of the further classifiers c2'. The addition of the further classifiers c2' thus has a direct effect on the model parameter values of the backbone M1 determined in the training as well as an effect on the model parameter values of the classifiers c1, c2 determined in the training. Overall, the further classifiers c1', c2' have a stabilizing effect on the training and improve the accuracy of the classifiers c1, c2. In experiments, it was possible to observe that an ordinal classification model M designed and trained as described delivers accurate and reliable results even when only the total score S or only the further total score S' is calculated and used for a classification 30 after the training. The ordinal classification model M thus does not necessarily have to utilize both paths over the classifiers c1, c2 and the further classifiers c1', c2' in the inference phase, but one of these paths will also suffice.

FIG. 5

Figure 5:
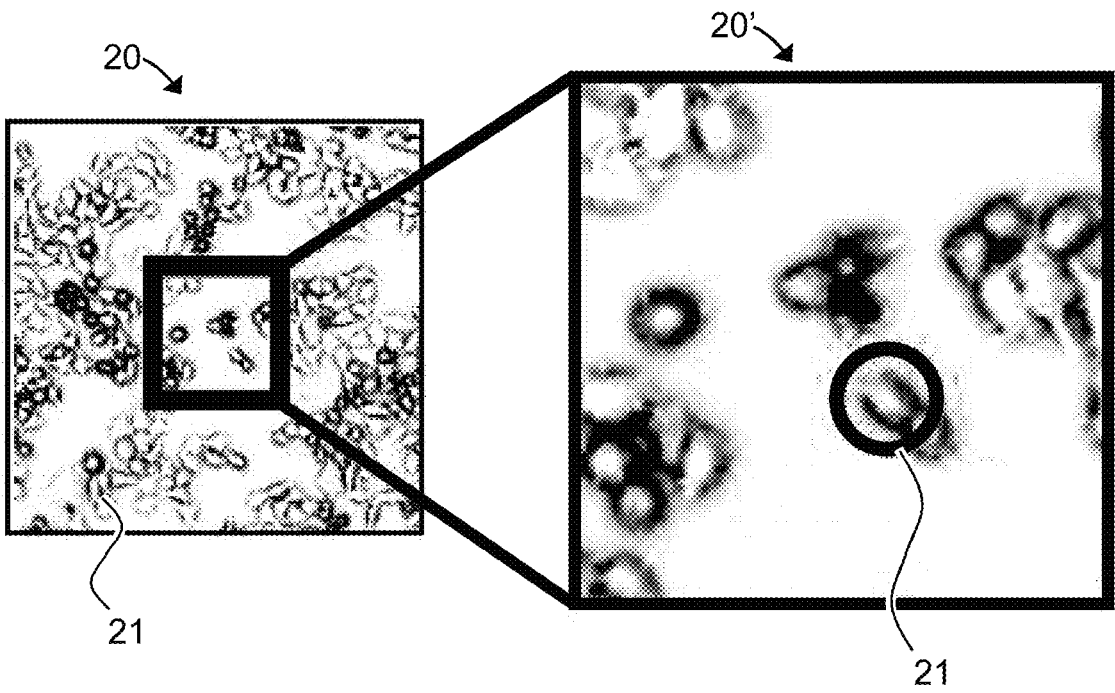
FIG. 5 schematically shows a microscope image to be evaluated.

FIG. 5 schematically shows a further microscope image 20, which is a sample image captured at a higher magnification than the microscope images described up to this point. The microscope image 20 shown in FIG. 5 shows a plurality of objects 21 in the form of biological cells. A section 20' of the microscope image 20 is shown in an enlargement. A typical task of an image analysis is to determine the size of the objects 21 or cells depicted in the microscope image 20. The size (image size) is determined in pixels and denotes, e.g., the largest dimension, i.e. the diameter of an object 21 or the area in pixels of an object 21. It can be desired to determine the size of a plurality or of all of the depicted objects 21. In the following, the term "object size" can also be understood as an average of the sizes of all or of a plurality of objects 21 of the same image.

The size determination is carried out here by an ordinal classification model which can be designed as described with reference the previous figures but which utilizes a larger number of classes. This is described in the following in relation to the next figures.

FIG. 6

FIG. 6 shows, on the left, a table with the classes K as utilized for a size classification of the objects of the microscope image 20 shown in FIG. 5. In this table, the left column indicates the respective number of a class K while the right column indicates the corresponding interval i. The first class K1 thus comprises objects with a size from and including an interval lower limit of 3.4 pixels up to an interval upper limit of 4.0 pixels, wherein the interval upper limit does not belong to the interval i. The classes K form intervals i of different widths, wherein the width of an interval i can be defined as the difference between its interval upper limit and its interval lower limit. An interval width increases exponentially with increasing object size in this example. Formulated more generally, the interval width increases in proportion to a magnitude of a value of the image property according to which the ordinal classes K are formed.

As already described, an ordinal classification model does not utilize classifiers that estimate whether image data belongs to these classes but rather classifiers that estimate whether image data belongs to one of the respective auxiliary classes. The auxiliary classes are listed in the further tables shown in FIG. 6.

The middle table in FIG. 6 lists auxiliary classes H formed for the classes K1-K17 listed in the table on the left. The corresponding interval limit j is indicated for the respective auxiliary classes H. The auxiliary classes H1 to H17 are formed by using the interval limits of the classes K as interval lower limits of the auxiliary classes H while interval upper limits of these auxiliary classes are not required. (Alternatively, an interval upper limit could be defined so as to cover all objects, for example an interval upper limit of 64 pixels or more.) The auxiliary class H2 comprises, for example, all object sizes from and including 4.0 pixels while there is no upper interval limit.

In a variant of the invention, only the auxiliary classes H1-H17 are utilized for which corresponding binary classifiers with the numbers 1-17 are trained. For example, for the training of the binary classifier no. 9, all microscope images whose depicted objects have a mean size greater than or equal to 13.5 pixels are given a positive annotation and all other microscope images are given a negative annotation. All binary classifiers are trained with the same (all) microscope images although the annotations differ.

In the inference phase (upon completion of the training), a microscope image is input into the ordinal classification model and the classifiers respectively indicate a probability that said image belongs to the corresponding auxiliary class. For example, the seventeen classifiers for the auxiliary classes 1 to 17 can output the following estimates: 0.97; 0.94; 0.95; 0.92; 0.90; 0.75; 0.12; 0.08; 0.04; 0.03; 0.03; 0.02; 0.02; 0.01; 0.01; 0.01; 0.01. The total score, i.e. the sum of all estimates, is 5.81 in this case. For a classification, the total score is compared with threshold values. The threshold values can lie, for example, at −0.5 and +0.5 around the corresponding class number so that the class no. 6 is selected for a total score between 5.5 and 6.5. In the cited example with a total score of 5.81, the class no. 6 is thus determined and the associated class size of [8.0-9.5] pixels can be indicated.

Alternatively, instead of indicating a class, a mapping to a continuous number scale can occur, in this example to a continuous specification of the cell size in pixels. A function that maps the class number to the auxiliary interval limits is used to this end. In the illustrated example, the auxiliary interval limits j result from the class numbers k by: $j = 2^{((k+6)/4)}$, where k runs from 1 to 17 for the calculation of the limits for the auxiliary classes H1 to H17. The relationship between the total score S and the continuous object size Y is then given by: $Y = 2^{((S+0.5+6)/4)}$, or more generally by replacing j with Y and replacing the variable for the class number k with (S+0.5) or with S plus a number greater than 0 and lower than 1. The total score S=5.81 thus yields the object size $Y = 2^{((5.81+0.5+6)/4)} = 8.4$. It is thereby possible to specify a numerical value of a classified image property on a continuous number scale by means of binary classifiers, thus enabling a more precise indication than a simple designation of the interval of a class.

If exclusively training images are used that satisfy the condition for the first auxiliary class H1, it is in principle also possible for the first auxiliary class to be omitted.

In a variant of the embodiment described above, further auxiliary classes called inverse auxiliary classes iH are used, which are listed in the table shown on the right in FIG. 6. The inverse auxiliary classes are numbered iH18 to iH34. A corresponding further binary classifier can be learned for each of the further/inverse auxiliary classes iH18-iH34. The auxiliary classes H1-H17 were formed using the interval lower limits of the 17 classes as limits, wherein it is predicated that image data (e.g., a microscope image) belongs to an auxiliary class whenever the associated lower limit of that auxiliary class is exceeded. The inverse auxiliary classes iH18-iH34 are formed using the interval upper limits of the 17 classes as limits, wherein it is predicated that image data belongs to an auxiliary class whenever a value determined for said image data falls below the associated limit of said auxiliary class.

A classification or a value in a continuous value range of the image property can also be determined from the estimates of the classifiers for the inverse auxiliary classes iH18-iH34. Matching or different classifications by the classifiers for the auxiliary classes H1-H17 and the classifiers for the inverse auxiliary classes iH18-iH34 provide information on the reliability of the classification. If continuous values are calculated, it is possible to form a more precise value specification in the form of an average while the difference between the continuous values constitutes a measure of the accuracy.

FIG. 7

Figure 7:
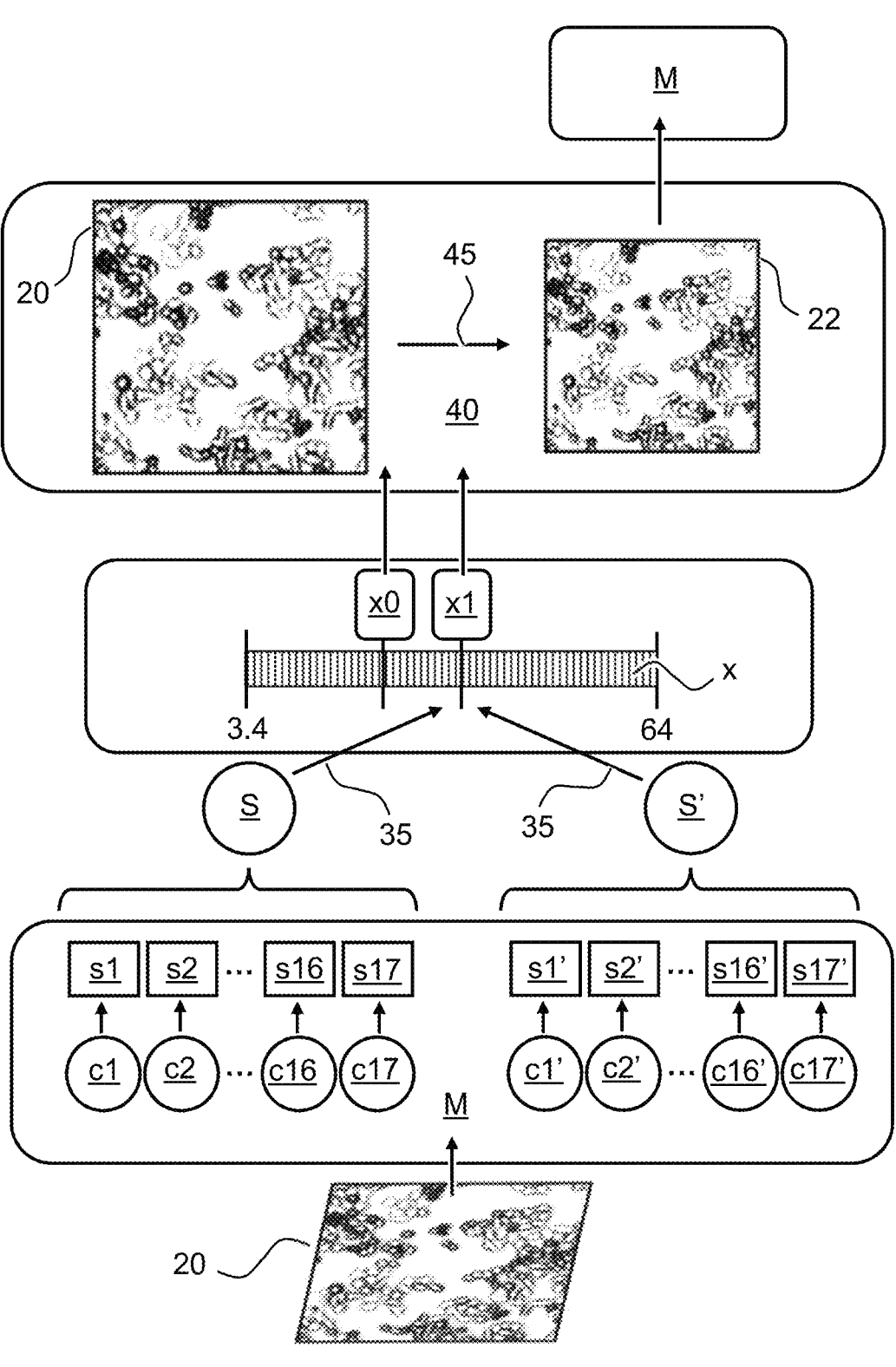
FIG. 7 schematically shows processes of a further example embodiment of a method according to the invention utilizing an ordinal classification model.

FIG. 7 illustrates an example embodiment of a method according to the invention which utilizes the classes and auxiliary classes of FIG. 6. In this example, the classes form an order based on the average size of objects depicted in the microscope image.

A microscope image 20 to be evaluated is input into the ordinal classification model M. For each of the auxiliary classes H1-H17 shown in FIG. 6, the ordinal classification model M comprises a corresponding binary classifier c1-c17. A binary classifier c1'-c17' is also respectively provided for each of the inverse auxiliary classes iH18-iH34. For the training of, for example, the binary classifier c4, all microscope images used in the training whose object size satisfied the threshold value condition "object size ≥5.7" were given a positive annotation (e.g. 1) while all other microscope images were given a negative annotation (e.g. 0). An equivalent regime is one in which for the training of the binary classifier c4 all microscope images of the classes K4-K17 are given a positive annotation and all microscope images of the classes K1-K3 are given a negative annotation.

The estimates s1-s17 of the binary classifiers c1-c17 are added together to form a total score S. Optionally, a further total score S' can also be formed by forming the sum of the estimates s1'-s17' of the binary classifiers c1'-c17' and, in the illustrative auxiliary classification described here, subtracting it from the number of binary classifiers c1'-c17' or classes K1-K17 increased by one, i.e. from 18 in this example. The two total scores S and S' should match and a discrepancy can serve as a measure of accuracy. Next, there occurs a conversion 35 of the respective total scores S and S' or of an average of S and S' to a value x1 within a continuous value range x of the image property based on which the classes K1-K17 are formed. In contrast to a classification into discrete classes, the value x1 can assume any value in the continuous value range x. The value range x here relates to the object size, which by way of example can lie between 3.4 and 64 pixels. Instead of object size, it is also possible for other geometric properties to constitute the image property according to which the classes are ordered. Other geometric properties include, e.g., a confluence, an orientation of a depicted object, for example a cover slip or sample carrier, or a distance of a depicted object from an image centre. Other image properties can relate to, e.g., the image quality, the image sharpness or the contrast in a certain image section.

An image processing algorithm 40 now processes the microscope image 20 as a function of the calculated value x1 of the image property and as a function of a predetermined target value x0 of the image property. For example, the calculation of the size of objects (cells) in the microscope image 20 can result in a value of x1=11 pixels while the target value is x0=8 pixels. The image processing algorithm 40 performs a conversion 45 of the microscope image 20 in order to form a converted microscope image 22 in which a value of the image property is closer to the target value x0. In this example, the conversion 45 can occur in the form of a scaling by a factor x0/x1=8/11.

The converted microscope image 22 is now input into the ordinal classification model M in order to ensure that the value x1 for the converted microscope image 22 corresponds to the target value x0. If it does not, the conversion 45 is carried out again.

Once the target value x0 is reached, the converted microscope image 22 can be fed to a further image processing program designed for microscope images with an image property corresponding precisely to the target value x0. For example, the image processing program can be designed to count depicted objects, wherein essentially only objects whose sizes in pixels correspond to the target value x0 are detected and counted.

Figure 8:
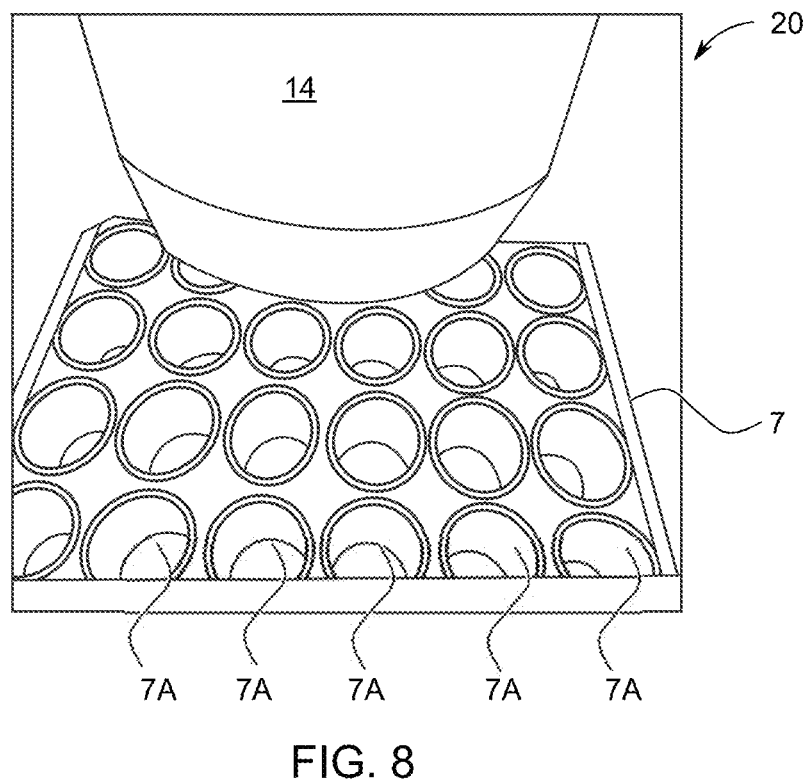
FIG. 8 schematically shows a microscope image to be evaluated.
Figure 9:
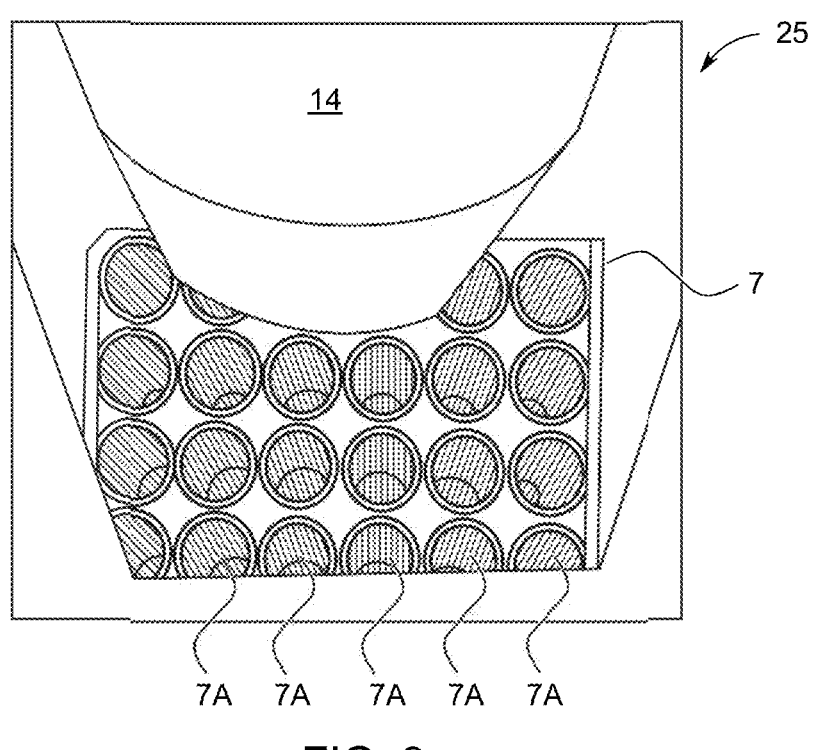
FIG. 9 schematically shows a converted microscope image calculated from the microscope image of FIG. 8 using an ordinal classification.

FIGS. 8 and 9

FIGS. 8 and 9 illustrate a further example for the application of a method according to the invention utilizing an ordinal classification model.

FIG. 8 shows a microscope image 20, which is an overview image captured by an overview camera on an inverted microscope. The overview camera views a sample carrier 7 at an oblique angle. A part of a condenser 14 is also visible in the microscope image. The sample carrier 7 in this example is a microtiter plate with a plurality of wells 7A in which samples can be located. An image processing is intended to carry out an automatic segmentation in which all wells 7A are detected. An automatically created segmentation mask can act, for example, as a navigation map, wherein a user selects a well in the segmentation mask and the sample stage is moved automatically so that the selected well lies on the optical axis of the objective. As illustrated in FIG. 8, the angle of view of the sample carrier 7 is oblique so that the circular wells 7A are distorted in perspective. This makes an automatic segmentation difficult. As a result, a conversion (homographic mapping) of the microscope image 20 into a top view should be carried out first.

FIG. 9 schematically shows such a microscope image 25, which is calculated from the microscope image 20 shown in FIG. 8 and corresponds to a top view of the sample carrier 7. In FIG. 9, an automatic segmentation by means of which the wells 7A are detected and marked (in a hatched pattern in FIG. 9) has also already been calculated. In order to calculate the conversion or homographic mapping of the microscope image 20 into a top view, a height position of the sample carrier 7 must be known or estimated. In principle, a height position of the depicted structures can be estimated from the microscope image 20 of FIG. 8 by means of a trained model. For example, it is possible to exploit the fact that the wells that appear elliptical in the microscope image 20 are in fact circular and a distortion of their circularity into an ellipse depends on the height position. Analogously, the edges of the sample carrier 7, which appear trapezoidal in the microscope image 20, in reality have a rectangular or square shape while the perspective distortion again depends on the height position. Calculation methods for calculating a top view when the height position is known have been described by the Applicant in DE 10 2020 101 191.

The estimation of a height position of the structures depicted in the microscope image 20 can occur by means of an ordinal classification model. The image property to be determined is accordingly the height position. Ordinal classes form an order of different height positions. Analogously to the foregoing descriptions, an ordinal classification model can be learned which receives a microscope image 20 as input and outputs as its result a total score or directly a height position. The classes can have different widths, i.e. limits between the auxiliary classes can have different distances to one another. This makes it possible to achieve a higher precision around a specific height position while a particularly large height position range can be covered with a lower precision.

The variants described in relation to the different figures can be combined with one another. The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage
7 Sample carrier
7A Wells of a sample carrier 7
8 Microscope camera
9 Overview camera
9A Field of view of the overview camera
9B Mirror
10 Computing device
11 Computer program
12 Touchscreen
14 Condenser
20A-20C Microscope images
20' Enlarged section of a microscope image
21 Sample/Object(s)
22 Converted/scaled microscope image
25 Top view calculated from the microscope image
30 Classification
35 Conversion of the total score to a value of the image property
40 Image processing algorithm
45 Conversion/scaling of the microscope image
100 Microscopy system
A Average of the total scores S and S'
c, c1-c17, c1'-c17' Binary classifiers
G1, G2 Threshold values for classification
H, H1-H17 (Cumulative) auxiliary classes
i Interval of a class
iH, iH18-iH34 Inverse auxiliary classes
j Interval limit of an auxiliary class or inverse auxiliary class
K, K1-K17 Classes
M Model for ordinal classification (ordinal classification model)
M1 Backbone of the ordinal classification model
R Order of the classes with respect to an image property
s, s1-s17, s1'-s17' Estimates of the binary classifiers
S, S' Total score containing the estimates of the binary classifiers
x Continuous value range of the image property
x0 Target value of the image property
x1 Value of the image property calculated from the total score

What is claimed is:

1. A computer-implemented method for an ordinal classification of at least one microscope image in order to calculate a classification into one of a plurality of classes which form an order with respect to an image property, wherein the method comprises:

inputting the at least one microscope image into a machine-learned model for ordinal classification comprising a plurality of binary classifiers, each of which respectively calculates an estimate regarding whether the microscope image belongs to a corresponding cumulative auxiliary class, wherein different numbers of the plurality of classes which follow each other in sequence in the order are included in a plurality of cumulative auxiliary classes, combining the estimates of the binary classifiers so as to form a total score; and calculating the classification by comparing the total score with threshold values, wherein the threshold values are defined in a variable manner depending on an application.

2. The computer-implemented method according to claim 1, further including:

outputting an action recommendation to a user as a function of the classification;

automatically adjusting the threshold values as a function of whether a user disregards the action recommendation.

3. The computer-implemented method according to claim 1, further including:

defining interval limits of the classes so that the classes form intervals of different widths.

4. The computer-implemented method according to claim 3, wherein a width of an interval of one of the classes is defined to be greater, the greater an interval lower limit of said class.

5. The computer-implemented method according to claim 3, wherein a width of the intervals is defined to be greater, the greater a distance of the corresponding class from a predetermined target value.

6. The computer-implemented method according to claim 1, wherein the microscope image is one of a plurality of training images with which a model is machine-learned, wherein the method further comprises calculating one or more new images from the microscope image using a data augmentation and using also the calculated new images as training images, wherein the total score determined from the estimates of the binary classifiers is taken into account in the data augmentation so that the new images belong to the same class.

7. The computer-implemented method according to claim 3, wherein the classes relate to a geometric property of an image content of the microscope image and the predetermined target value is a target value of the geometric property; and wherein an image processing algorithm converts the microscope image as a function of the classification so that the geometric property is rendered closer to the predetermined target value.

8. The computer-implemented method according to claim 7, wherein the geometric property is an image size of depicted objects, wherein the image processing algorithm performs a scaling of the microscope image to scale the image size of depicted objects to a desired image size.

9. The computer-implemented method according to claim 7, further including:

calculating a new classification for a microscope image converted by the image processing algorithm, wherein the image processing algorithm converts the converted microscope image as a function of the new classification in order to further improve an approximation of the target value by the geometric property.

10. The computer-implemented method according to claim 1, further including:

training an ordinal classification model using microscope images for which a predetermined class annotation respectively indicates which class the associated microscope image belongs to, wherein the classes form an order with respect to an image property from a first class to a last class;

wherein at least a plurality of inverse cumulative auxiliary classes are formed which contain precisely the classes not contained in one of the cumulative auxiliary classes;

wherein auxiliary class annotations are generated from the class annotations for each microscope image, said auxiliary class annotations affirming or denying that the associated microscope image belongs to the different cumulative auxiliary classes and inverse cumulative auxiliary classes;

wherein the ordinal classification model comprises the machine-learned model for ordinal classification including a respective binary classifier for each of the cumulative auxiliary classes and inverse cumulative auxiliary classes, said respective binary classifier being trained to calculate an estimate as to whether a microscope image belongs to the corresponding cumulative auxiliary class or an estimate as to whether a microscope image belongs to the corresponding inverse cumulative auxiliary class;

inputting the at least one microscope image into the ordinal classification model and forming the total score by combining thus calculated estimates of at least one of the binary classifiers of the cumulative auxiliary classes or thus calculated estimates of the binary classifiers of the inverse cumulative auxiliary classes.

11. The computer-implemented method according to claim 10, wherein a plurality of cumulative auxiliary classes are formed in which different numbers of classes that follow each other in sequence are included as follows:

a first auxiliary class comprises all classes, each further auxiliary class respectively comprises one less class, according to the order and starting with the first class, a last auxiliary class comprises only the last class, wherein a plurality of inverse cumulative auxiliary classes are formed in which different numbers of classes that follow each other in sequence are included as follows:

a first inverse auxiliary class includes only the first class, each further inverse auxiliary class respectively additionally comprises one further class according to the order, a last inverse auxiliary class includes all classes.

12. The computer-implemented method according to claim 10, for a classification using the total score, rounding the total score to a whole number, and identifying the auxiliary class that corresponds numerically to the whole number, wherein the classification occurs into the class that covers an interval running from a limit value of the identified auxiliary class to a limit value of a subsequent auxiliary class.

13. The computer-implemented method according to claim 10, further including:

converting the total score to a value in a continuous value range of the image property.

14. The computer-implemented method of claim 1, wherein the total score is calculated as a sum of the estimates of all of the binary classifiers.

15. The computer-implemented method of claim 1, wherein each threshold value differs from every other threshold value, and the threshold values define a plurality of intervals in a range of possible values for the total score.

16. A microscopy system comprising:

a computer system including at least one computing device, wherein the computer system is configured to execute a method for an ordinal classification of at least one microscope image in order to calculate a classification into one of a plurality of classes which form an order with respect to an image property, wherein the method comprises:

inputting the at least one microscope image into a machine-learned model for ordinal classification comprising a plurality of binary classifiers, each of which respectively calculates an estimate regarding whether the microscope image belongs to a corresponding cumulative auxiliary class, wherein different numbers of the plurality of classes which follow each other in sequence in the order are included in a plurality of cumulative auxiliary classes, combining the estimates of the binary classifiers so as to form a total score; and calculating the classification by comparing the total score with threshold values, wherein the threshold values are defined in a variable manner depending on an application.

17. The microscopy system of claim 16, further comprising a microscope for image capture.

18. The microscopy system of claim 16, the method further including:

outputting an action recommendation to a user as a function of the classification;

automatically adjusting the threshold values as a function of whether a user disregards the action recommendation.

19. The microscopy system of claim 16, the method further including:

defining interval limits of the classes so that the classes form intervals of different widths.

20. The microscopy system of claim 19, wherein the classes relate to a geometric property of an image content of the microscope image and the predetermined target value is a target value of the geometric property; and wherein an image processing algorithm converts the microscope image as a function of the classification so that the geometric property is rendered closer to the predetermined target value.

* * * * *